United States Patent
Chiou

(10) Patent No.: US 8,051,494 B2
(45) Date of Patent: Nov. 8, 2011

(54) MATRIX FREE NON-WOVEN LAYER OF POLYPYRIDAZLE SHORT FIBER

(75) Inventor: Minshon J. Chiou, Chesterfield, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 114 days.

(21) Appl. No.: 12/086,221

(22) PCT Filed: Dec. 7, 2006

(86) PCT No.: PCT/US2006/061738
§ 371 (c)(1),
(2), (4) Date: Jun. 5, 2008

(87) PCT Pub. No.: WO2007/145673
PCT Pub. Date: Dec. 21, 2007

(65) Prior Publication Data
US 2009/0188014 A1    Jul. 30, 2009

Related U.S. Application Data

(60) Provisional application No. 60/748,877, filed on Dec. 8, 2005.

(51) Int. Cl.
*F41H 1/02* (2006.01)
*F41H 1/08* (2006.01)
*F41H 13/00* (2006.01)

(52) U.S. Cl. .......................................... 2/2.5; 89/36.05

(58) Field of Classification Search .................. 2/2.5
See application file for complete search history.

(56) References Cited

U.S. PATENT DOCUMENTS

| 3,837,054 A | * | 9/1974 | Fehrer | 28/107 |
|---|---|---|---|---|
| 5,569,528 A | | 10/1996 | Van der Loo et al. | |
| 5,736,474 A | | 4/1998 | Thomas | |
| 2006/0286882 A1 | * | 12/2006 | Samant et al. | 442/134 |
| 2008/0145598 A1 | * | 6/2008 | Levit et al. | 428/116 |
| 2009/0282596 A1 | * | 11/2009 | Carbajal et al. | 2/2.5 |
| 2010/0003485 A1 | * | 1/2010 | Hovanec et al. | 428/219 |

FOREIGN PATENT DOCUMENTS

| WO | WO 94/21450 | 9/1994 |
|---|---|---|
| WO | WO 99/27169 | 6/1999 |
| WO | WO 00/77283 A2 | 12/2000 |
| WO | WO 2004/003269 | 1/2004 |
| WO | WO 2005/001373 | 1/2005 |

OTHER PUBLICATIONS

Hageman, et al.—An ab initio study of the structual and physical properties of a novel rigid-rod polyrner:PIPD-Polymer, 1999, 40, 1313, Elsevier Science Ltd.

Klop et al.—XRD study of the new rigid-rod polymer fibre PIPD, Polymer 1998, 39, 5987, Elsevier Science Ltd.

Sikkema,—Design, synthesis and properties of a novel rigid rod polymer, PIPD or "M5": high modulus and tenacity fibres with substantial compressive strength. Polymer, 1998, 39, 5981, Elsevier Science Ltd.

Brew et al.—The properties of PIPD-fibre/epoxy composites. Composites Science and Technology, 1999, 59, 1109, Elsevier Science Ltd.

Van Der Jagt et al., The potential of a new rigid-rod polymer fibre ('5') in advanced composite structures. Polymer 1999, 40, 1035 Elsevier Science Ltd.

* cited by examiner

*Primary Examiner* — Bobby Muromoto, Jr.

(57) ABSTRACT

Provided are non-woven constructions and fabrics comprising polypyridazole short fiber; the short fiber characterized by an average filament tenacity of at least 15 grams per denier; an average filament modulus of at least 500 grams per denier; an average filament density of at least 1.6 grams per cubic centimeter; an average filament length of 30 to 100 millimeters; and an average filament denier per filament of 0.1 to 10; wherein the construction is substantially free of matrix.

16 Claims, No Drawings

MATRIX FREE NON-WOVEN LAYER OF POLYPYRIDAZLE SHORT FIBER

CROSS REFERENCE TO RELATED APPLICATIONS

This application claims benefit of U.S. Application No. 60/748,877 filed Dec. 8, 2005, the disclosure of which is incorporated herein by reference.

FIELD OF THE INVENTION

The invention concerns non-woven layers useful in ballistic applications.

BACKGROUND OF THE INVENTION

Personal ballistic body armor, particularly vests, helmets, and other articles, are formed generally of materials which serve to prevent penetration of a bullet or other projectile, and any other object that is forcefully applied to the armor, such as a knife. These articles are primarily used for the armed forces, but also have police and civilian applications. There is a growing demand to improve the wearability and the overall effectiveness of armor systems used by soldiers and police offices in combative environments. Overall thickness and weight of armor systems can effect wearability, but reducing these parameters in currently known systems can compromise the armor's effectiveness against penetration.

U.S. Pat. No. 5,569,528 discloses a non-woven layer having short polyolefin fibers. The fibers are reported to have a length of 40-100 mm, a tensile strength of at least 1.2 GPa and a modulus of at least 40 GPa.

PCT Patent Application No. WO94/21450 discloses a ballistic resistant material containing at least two types of fibrous materials. Polyaramid and polyethylene blends are described. The materials are blended and consolidated together into a single layer of nonwoven, composite material.

PCT Patent Application No. WO2005/001373 teaches a ballistic-resistant material having a exterior layers formed of a ballistic-resistant non-woven textile and an interior layer of ballistic-resistant woven textile arranged between the exterior layers.

There is a need in the art for continued improvements in the construction of ballistic fabrics and articles.

SUMMARY OF THE INVENTION

Provided are non-woven constructions and fabrics comprising polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; and an average filament denier per filament (dpf) of 0.1 to 10; wherein the construction is substantially free of matrix.

Also provided are penetration resistant articles and garments containing one or more of such non-woven constructions or fabric and methods of making such constructions and fabrics.

The foregoing general description and the following detailed description are exemplary and explanatory only and are not restrictive of the invention, as defined in the appended claims.

DETAILED DESCRIPTION OF ILLUSTRATIVE EMBODIMENTS

Provided are non-woven constructions comprising polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; and an average filament denier per filament (dpf) of 0.1 to 10; wherein the construction is substantially free of matrix.

In certain embodiments, the constructions are fabrics or laminates.

In some embodiments, the polypyridazole fiber has an inherent viscosity of greater than 20 dl/g. In other embodiments, the polypyridazole fiber has an inherent viscosity of greater than 25 dl/g. In yet other embodiments, the polypyridazole fiber has an inherent viscosity of greater than 28 dl/g. One preferred polypyridazole is poly[2,6-diimidazo[4,5-b:4,5-e]-pyridinylene-1,4(2,5-dihydroxy)phenylene).

In some embodiments, the construction further comprises aramid fiber in amount of up to 15% by weight of the total fiber. One preferred aramid fiber is poly (p-phenylene terphthalamide) staple fiber.

Also provided are multilayer fabrics comprising at least one layer which comprises polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; and an average filament denier per filament (dpf) of 0.1 to 10; wherein the layer is substantially free of matrix. Suitable polypyridazole fibers include those described herein.

The multilayer fabrics can further comprise aramid fiber in amount of up to 15% by weight of the total fiber.

The invention also concerns penetration resistant articles and garments containing at least one fabric or construction described herein.

The invention also concerns a method of preparing a fabric comprising polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; and an average filament denier per filament (dpf) of 0.1 to 10; wherein the layer is substantially free of matrix;

said method comprises subjecting the polypyridazole short fiber to a needle punching process.

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Useful fibers include poly(pyridazoles). Poly(pyridazoles) include poly(pyridimidazle), poly(pyridothiazole), poly(pyridoxazole), poly(pyridobisimidazole), poly(pyridobisthiazole), and poly(pyridobisoxazole).

Poly(pryidobisimidazole) is a rigid rod polymer that is of high strength. The poly(pyridobisimidazole) fiber can have an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

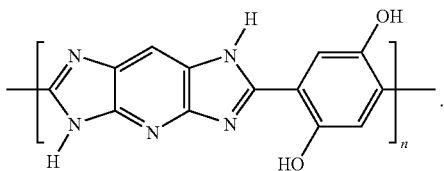

Poly(pyridobisimidazole) fiber can be distinguished from the well known commercially available PBI fiber or poly(benzimidazole) fiber in that that poly(benzimidazole) fiber is a poly(bibenzimidazole). Poly(bibenzimidazole) fiber is not a rigid rod polymer and has low fiber strength and low tensile modulus when compared to poly(pyridobisimidazoles).

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

As used herein, the term "staple fibers" refers to fibers that are cut to a desired length or fibers that occur naturally with or naturally have a low ratio of length to width across its cross-sectional area perpendicular to its length when compared with filaments. Length can vary from about 0.1 inch to several feet. In some embodiments, the length is from 0.1 inch to about 8 inches. Man made staple fibers are cut to a length suitable for processing on cotton, woolen, or worsted yarn spinning equipment.

The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a length of 1 to 30 centimeters. Staple fibers made by short staple processes result in a fiber length of 1 to 6 centimeters.

The staple fibers can be made by any process. The staple fibers can formed by stretch breaking continuous fibers resulting in staple fibers with deformed sections that act as crimps. The staple fibers can be cut from continuous straight fibers using a rotary cutter or a guillotine cutter resulting in straight (i.e., non crimped) staple fiber, or additionally cut from crimped continuous fibers having a saw tooth shaped crimp along the length of the staple fiber, with a crimp (or repeating bend) frequency of no more than 8 crimps per centimeter.

Stretch broken staple fibers can be made by breaking a tow or a bundle of continuous filaments during a stretch break operation having one or more break zones that are a prescribed distance creating a random variable mass of fibers having an average cut length controlled by break zone adjustment.

Staple fibers of this invention can be converted into yarns using traditional long and short staple ring spinning processes which are well known in the art. For short staple, cotton system spinning fiber lengths from ¾ inch to 2-¼ inch (i.e., 1.9 to 5.7 cm.) are typically used. For long staple, worsted or woolen system spinning, fibers up to 6-½ inches (i.e., 16.5 cm.) are typically used. However, this is not intended to be limiting to ring spinning because the yarns may also be spun using air jet spinning, open end spinning, and many other types of spinning which converts staple fiber into useable yarns.

The stretch broken staple fibers typically have length of up to 7 inches (i.e., 17.8 cm.) long and can be 15 made using traditional stretch-broken tow to top staple processes. Staple fibers having maximum lengths of up to around 20 inches (i.e., 51 cm) are possible through processes as described for example in PCT Patent Application No. WO 0077283. Yarns are so made by consolidated fibers into spun yarn using filament entanglement with air jets having a tenacity in the range of 3 to 7 grams per decitex. These yarns may have secondary twist, that is, they may be twisted after formation to impart more tenacity to the yarn, in which case the tenacity can be in the 10 to 18 grams per denier (i.e., 9 to 17 grams per dtex) range. Stretch broken staple fibers normally do not require crimp because the process imparts a degree of crimp into the fiber.

By "non-woven" fabric is meant a network of fibers, including unidirectional (if contained within a matrix resin), felt, fiber batts, and the like.

The invention is exemplified by the following examples which are not intended to limit the scope of the invention.

Comparative Example 1

In the Comparative Example 1, layers of woven fabric is made from high tenacity of 660 dtex poly(p-phenylene terphthalamide) continuous filament yarn with a linear density of 1.66 dtex per filament with the construction of 13.4 ends/cm in both warp and fill directions, available from E. I. DuPont de Nemours and Company under the trademark Kevlar KM2®. The tensile strength of the 660 dtex aramid used in the woven fabric is 25 gram/dtex, and the density of the fiber is 1.44 gram/cm$^3$. Twenty one layers of the fabric of about 15"×15" size are stitched together around the edge and with a cross stitch to form a composite structure with a total areal density of about 3.8 kg/m$^2$. The assembly is then tested against 17-grain fragment per MIL-STD-662E testing standard with the V50 result of 1750 ft/sec.

Example 1

In the Example 1 of this invention, felt made of M5® fiber is prepared from the continuous filament yarns of M5® with a tenacity of 35 gpd, modulus of 2000 gpd, and fiber density of 1.65 g/cm$^3$. The continuous filaments yarns were first crimped and then cut into about 5 cm length short staple fibers. The staple fibers were then converted into felt via a variety of equipment and process, including needle punching, well known to the trade. The areal density of the compacted layer of M5® felt is 180 g/m$^2$. Twenty-one layers of the M5® felt of this invention with about 15"×15" size are stitched together around the edge and with a cross stitch to form a composite structure with a total areal density of about 3.8 kg/m². The assembly is then tested against 17-grain fragment per MIL-STD-662E testing standard. The result of V50 is expected to be better than that of the prior art with woven fabric, as described in Comparative Example 1.

Example 2

In the Example 2 of this invention, felt made of M5® fiber is prepared from the continuous filament yarns of M5® having a tenacity of 35 gpd, modulus of 2000 gpd, and fiber density of 1.65 g/cm³. The continuous filaments yarns were first crimped and then cut into about 5 cm length short staple fibers. The staple fibers were then converted into felt via a variety of equipment and process, including needle punching, well known to the trade as described in Example, except that the areal density of the compacted layer of M5® felt is 420 g/m². Nine layers of the M5® felt of this invention with about 15"×15" size are stitched together around the edge and with a cross stitch to form a composite structure with a total areal density of about 3.8 kg/m². The assembly is then tested against 17-grain fragment per MIL-STD-662E testing standard. The result of V50 is expected to be better than that of the prior art with woven fabric, as described in Comparative Example 1.

Example 3

In the Example 3 of this invention, felt made of M5® fiber is prepared from the continuous filament yarns of M5® having a tenacity of 35 gpd, modulus of 2000 gpd, and fiber density of 1.65 g/cm³ as disclosed in Example 1. The short staple fibers were produced by stretch broken of the continuous filament yarns into a typical length of 7 and 11 cm. The staple fibers were then converted into felt via a variety of equipment and process, including needle punching, well known to the trade. The areal density of the compacted layer of M5® felt is 180 g/m². Twenty-one layers of the M5® felt of this invention with about 15"×15" size are stitched together around the edge and with a cross stitch to form a composite structure with a total areal density of about 3.8 kg/m². The assembly is then tested against 17-grain fragment per MIL-STD-662E testing standard. The result of V50 is expected to be better than that of the prior art with woven fabric, as described in Comparative Example 1.

Example 4

In the Example 4 of this invention, felt made of M5® fiber is prepared from the continuous filament yarns of M5® having a tenacity of 35 gpd, modulus of 2000 gpd, and fiber density of 1.65 g/cm³ as disclosed in Example 1. The continuous filaments yarns were first crimped and then cut into about 5 cm length short staple fibers. The staple fibers were then converted into felt via a variety of equipment and process, including needle punching, well known to the trade. The areal density of the compacted layer of M5® felt is 180 g/m². Eleven layers of the M5® felt of this invention with about 15"×15" size are stacked together with ten layers of woven fabric made from Comparative Example 1, and are further stitched together around the edge and with a cross stitch to form a composite structure with a total areal density of about 3.8 kg/m². The assembly is then tested against 17-grain fragment per MIL-STD-662E testing standard. The result of V50 is expected to be better than that of the prior art with woven fabric, as described in Comparative Example 1.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed:

1. A needle punched non-woven construction comprising polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; an inherent viscosity of greater than 25 dl/g; and an average filament denier per filament (dpf) of 0.1 to 10; wherein the construction is substantially free of matrix.

2. The construction of claim 1 wherein the polypyridazole fiber having an inherent viscosity of greater than 28 dl/g.

3. The construction of claim 1 wherein the polypyridazole is poly[2,6-diimidazo[4,5-b:4,5-e]-pyridinylene-1,4(2,5-dihydroxy)phenylene).

4. The construction of claim 1 further comprising aramid fiber in amount of up to 15% by weight of the total fiber.

5. The construction of claim 4 wherein the aramid fiber is poly(p-phenylene terphthalamide) staple fiber.

6. A multilayer fabric comprising at least one needle punched nonwoven layer which comprises polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; an inherent viscosity of greater than 25 dl/g; and an average filament denier per filament (dpf) of 0.1 to 10; wherein the layer is substantially free of matrix.

7. The fabric of claim 6 wherein the polypyridazole fiber having an inherent viscosity of greater than 28 dl/g.

8. The fabric of claim 6 wherein the polypyridazole is poly[2,6-diimidazo[4,5-b:4,5-e]-pyridinylene-1,4(2,5-dihydroxy)phenylene).

9. The fabric of claim 6 further comprising aramid fiber in amount of up to 15% by weight of the total fiber.

10. The fabric of claim 9 wherein the aramid fiber is poly (p-phenylene terphthalamide) staple fiber.

11. A penetration resistant article comprising at least one construction of claim 1.

12. A penetration resistant article comprising the fabric of claim 6.

13. A garment comprising at least one construction of claim 1.

14. A garment comprising the fabric of claim 6.

15. A method of preparing a needlepunched non-woven fabric comprising needlepunching a polypyridazole short fiber; said short fiber characterized by an average filament tenacity of at least 15 grams per denier (gpd); an average filament modulus of at least 500 gpd; an average filament density of at least 1.6 g/cc; an average filament length of 30 to 100 mm; an inherent viscosity of greater than 25 dl/g; and an average filament denier per filament (dpf) of 0.1 to 10; wherein the layer is substantially free of matrix.

16. The method of claim 15 wherein the polypyridazole is poly[2,6-diimidazo[4,5-b:4,5-e]-pyridinylene-1,4(2,5-dihydroxy)phenylene).

* * * * *